United States Patent [19]

Hirmann

[11] 4,108,486
[45] Aug. 22, 1978

[54] INFLATABLE THRUST PRODUCING TOOL

[75] Inventor: Georg Hirmann, Zürich, Switzerland

[73] Assignee: Repapress AG, Romanshorn, Switzerland

[21] Appl. No.: 743,118

[22] Filed: Nov. 19, 1976

Related U.S. Application Data

[60] Continuation of Ser. No. 600,949, Aug. 1, 1975, which is a division of Ser. No. 450,193, Mar. 11, 1974, Pat. No. 3,924,843.

[30] Foreign Application Priority Data

Mar. 9, 1973 [CH] Switzerland .................. 3498/73

[51] Int. Cl.² .............................................. B25B 1/00
[52] U.S. Cl. ............................. 294/99 R; 294/63 A
[58] Field of Search ............. 294/99 R, 93, 63 A, 294/64 R, 65, 81 R, 86 A, 87 R, 88; 214/6 A, 309, 65, 655, 1 BD; 269/20, 22, 139; 100/260 A; 254/93 HP; 144/281 A; 150/9; 92/92; 81/43

[56] References Cited

U.S. PATENT DOCUMENTS 1,790,688  2/1931  Willer .................. 294/63 A

FOREIGN PATENT DOCUMENTS 102,511  7/1963  Norway .................. 294/63 A
898,032  6/1962  United Kingdom .......... 294/63 A

*Primary Examiner*—James B. Marbert
*Attorney, Agent, or Firm*—Herbert L. Lerner

[57] ABSTRACT

A tool includes a force-producting device having at least one inflatable thrust producing member displaceable so as to apply a given force, and a pivotally displaceable member engageable by said inflatable thrust producing member and pivotally displaceable thereby. The tool may be used as clippers, pinchers, pliers, tongs, and the like.

7 Claims, 27 Drawing Figures

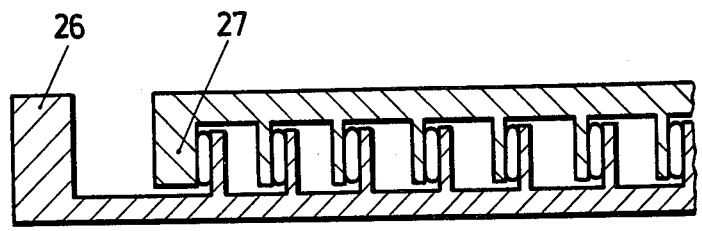
FIG. 2
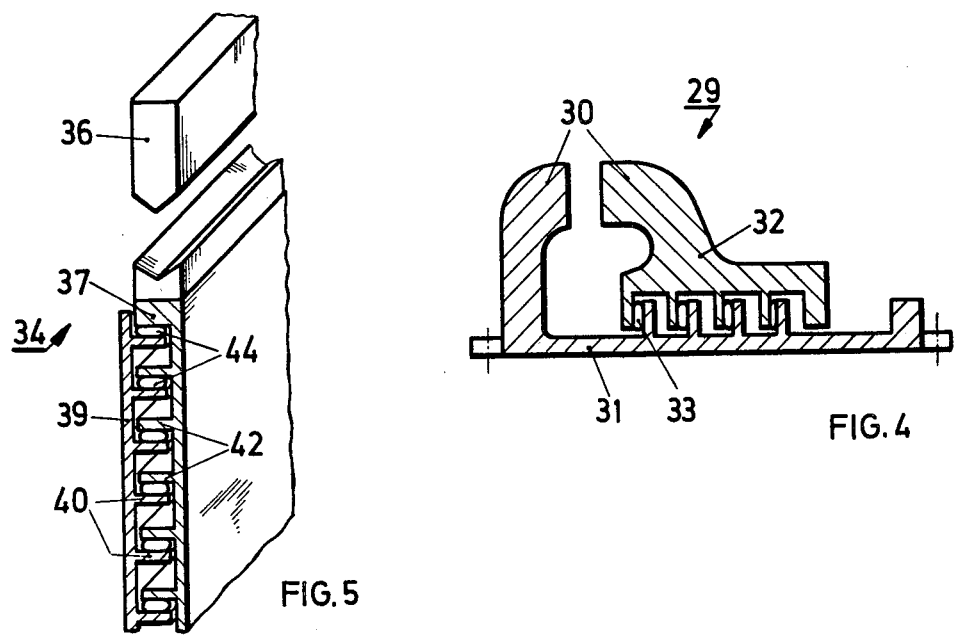
FIG. 5
FIG. 4
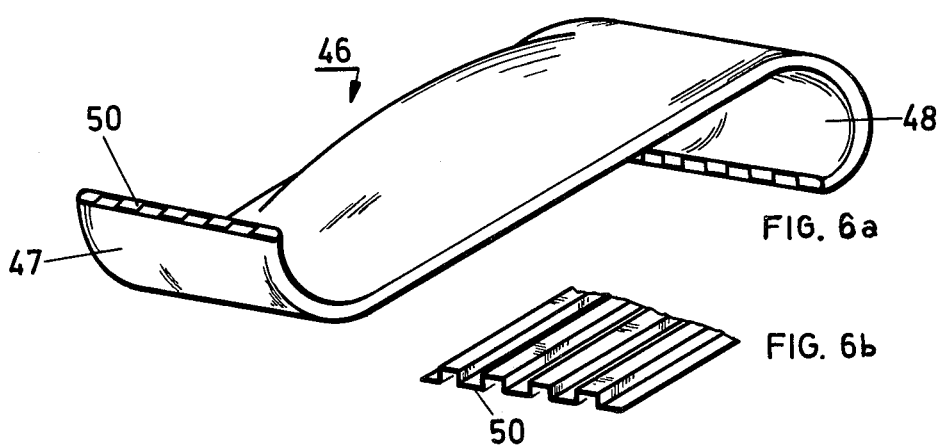
FIG. 6a
FIG. 6b

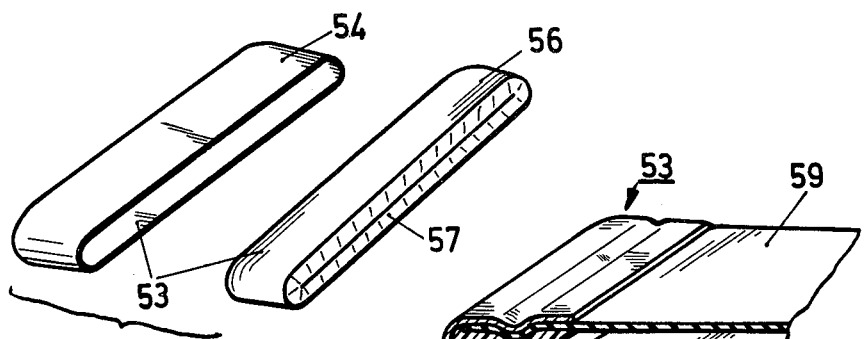
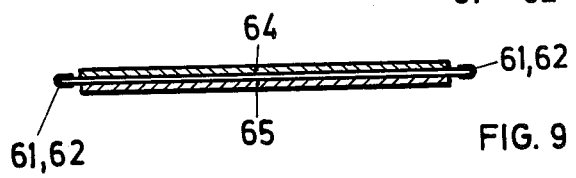
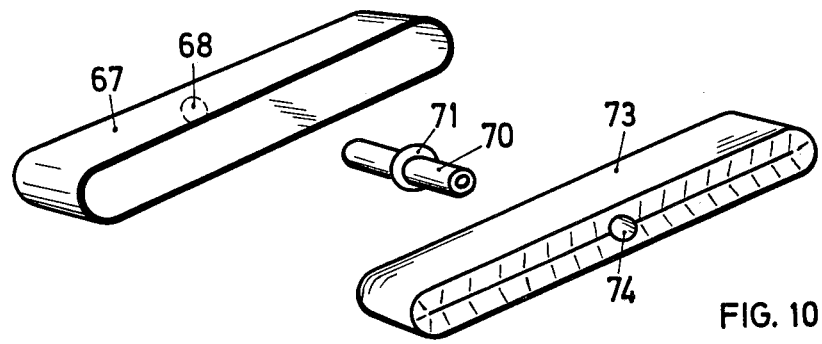
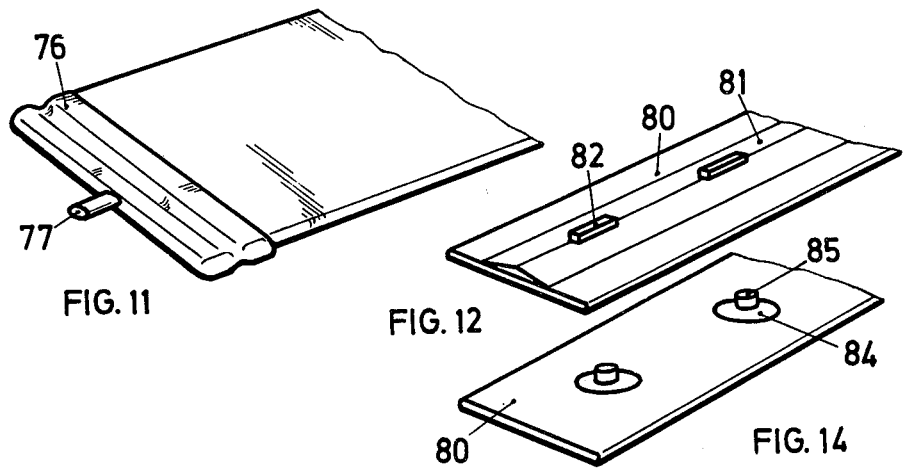
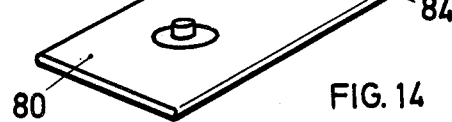

INFLATABLE THRUST PRODUCING TOOL

This is a continuation of application Ser. No. 600,949, filed Aug. 1, 1975, which in turn, is a division of application Ser. No. 450,193, now U.S. Pat. No. 3,924,843, dated Dec. 9, 1975.

The invention relates to a tool.

Heretofore known tools are either manually or machine-actuated and are therefore either greatly limited in thr range of their use because of the limits of human force that is applicable or, with motorized drives, are of complex construction and therefore immovable and susceptible to trouble.

It is an object of the invention to provide a tool that is of simple construction but nevertheless utilizable in broad ranges of use.

With the foregoing and other objects in view, there is provided, in accordance with the invention, a tool comprising a force-producing device having at least one inflatable member.

Other features which are considered as characteristic for the invention are set forth in the appended claims.

Although the invention is illustrated and described herein as embodied in the tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 2 is an enlarged sectional view of FIG. 1 taken along the line II—II and rotated through 90°, the thrust producing unit of the invention being shown partly broken away and with an additional vise structure;

FIG. 4 is a longitudinal sectional view of a vise actuable by the multiple thrust producing unit of FIG. 1;

FIG. 5 is a diagrammatic, perspective view, partly in section and partly broken away of a folding or bending press provided with the pneumatic multiple thrust producing unit of the invention;

FIG. 6a is a perspective view of a section of a twisted or sinuous hose or tube having flat bends therein for use in the embodiment shown in FIG. 1;

FIG. 6b is a perspective view, partly broken away of a profile retaining insert forming part of the sinuous hose of FIG. 6a;

FIG. 7 is an exploded perspective view of members forming a substantially flat or planar closure of the ends of the hose of the invention;

FIG. 8 is a perspective view, partly in section and partly broken away of a closed or tied off hose end;

FIG. 9 is a longitudinal view at reduced scale of a hose tied off at both ends thereof by flat closure members and serving as thrust member between two plates shown in section;

FIG. 10 is an exploded perspective view of a flat closure member according to FIG. 7 modified to include a pressure fluid supply inlet tube;

FIG. 11 is a perspective view on reduced scale of a flat hose tied off at an end thereof with the flat closure member and supply inlet tube of FIG. 10;

FIG. 12 is a perspective view of a hose member with a path or track and retaining projection;

FIG. 14 is a perspective view of another hose member with projections analogous to that of FIG. 12;

Figures 1, 3:
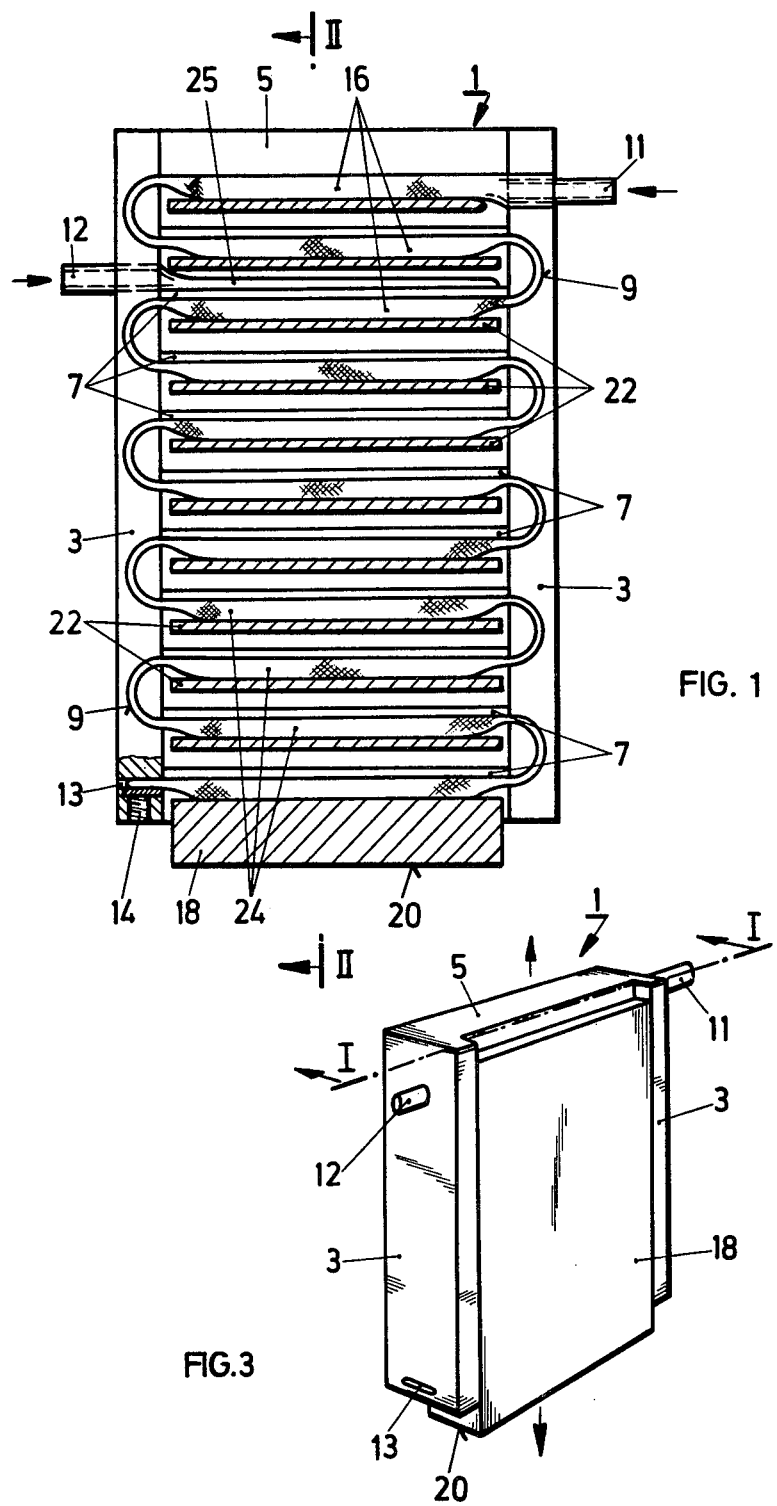
FIG. 1 is a diagrammatic view, partly in section taken along the line I—I in FIG. 3 of a pneumatic multiple thrust producing unit.
FIG. 3 is a perspective view on reduced scale of the thrust producing unit of FIG. 1.

Referring now to the drawing and first, particularly to FIGS. 1 and 3 thereof, there is shown therein a housing 1 with two lateral guide walls 3 and a rear wall 5, as well as transverse walls 7 extending parallel to the rear wall 5 and disposed at uniform spacing one from the other over the length of the housing 1. Both guide walls 3 are formed with semicircular cylindrical grooves 9. Each of the guide walls 3 is also provided with a connector nipple 11, 12. One of the guide walls 3 is furthermore formed with a recess 13 as well as a threaded bore 14 communicating with the recess 13. In FIG. 1, there is shown a sinuous hose 16 which is disposed in the compartments formed between the transverse walls 7 and extends within the cylindrical grooves 9 from one compartment to the other. Detached from the housing 1 is a slidable cover member 18 which is suitably guided in the guide walls 3. The cover member 18 is provided with a front wall 20 and, analogous to the housing 1, is provided with transverse walls 22 mutually spaced-apart equal distances which correspond to the spacing between the transverse walls 7 of the housing 1. In actuating condition, the cover member 18 is located on top of the housing 1 and both thereof are relatively movable a distance commensurate with the spacing between the respective transverse walls 7 and 22 thereof, as well as commensurate with the thickness of those walls, as shown in FIG. 1. Respective lengths of the sinuous hose 16 that act as operating bellows 24 are disposed between two respective adjacent transverse walls 7. They are limited or bounded respectively on the one side by a transverse wall 7 of the housing 1 and on the opposing side by a transverse wall 22 of the cover member 18. In one compartment between two transverse walls 7 which is subdivided by a transverse wall 22, there are located not only one operating bellows 24 but also a restoring bellows 25 which is connected to a nipple 12, while the one end of the sinuous hose 16 is connected to the nipple 11. The other end of the continuous, sinuous hose 16 extends into the recess 13 and is retained therein by a non-illustrated threaded pin or set screw which is threadedly secured in the threaded bore 14.

IF the cover member 18 is to be slid relative to the housing 1, for example, in opposition to a great eternal resistance, a pressure medium, such as compressed air, pressure oil or water under pressure, for example, is fed through the nipple 11 to the sinuous hose 16 which accordingly expands the hose at the operating bellows sections 24 thereof so that the latter exert a force commensurate with the pressure and the bearing or contact surface of the bellows 24 on the transverse walls 7 and 22 which confine the respective bellows 24, and tend to slide the respective transverse walls 7 and 22 away from one another. Each bellows 24 exerts an equal force on the respective transverse walls 7 and 22 which limit or confine it, so tht the cover member 18 tends to be displaced relative to the housing 1 by a force applied to both the housing 1 and the cover member 18 which is proportional to the number of bellows 24 and to the prevailing pressure of the working pressure medium. In this manner, a very great force is produced in an extremely small space. In order to restore the housing 1 and the cover member 18 to their starting positions, the sinuous hose 16 e.g. the operating bellows 24 are depressurized, and pressure medium is then fed through the nipple 12 into the restoring bellows 25. The latter, as shown in FIG. 1, acts in the opposite direction and slides the cover member 18 on and along the housing 1 back in a direction opposite the preceding direction of displacement thereof.

In FIG. 2 there is shown diagrammatically how, by suitably constructing the ends of the housing 1 and the cover member 18 as clamping jaws 26 and 27, the resulting structure can be used as a clamp or tongs or a vise.

There is shown diagrammatically in FIG. 4, the application of a multiple thrust producing member, such as that shown in FIG. 1, in a vise 29 of conventional type. The vise 29 has two clamping jaws 30, the support member of one of the jaws 30 corresponding to the housing 31 and the support member for the other jaw corresponding to the slidable cover member 32. An operating hose 33 is sinuously disposed so that respective bellows portions thereof are located between adjacent transverse walls of the housing 31 and the cover member 32. By suitably pressurizing the operating hose 33, the housing 31 and the cover member 32 and, accordingly, the clamping jaws 30, are slid toward one another so as to hold fast a workpiece between the clamping jaws 30 with relatively large force.

Depending upon the expansions or elongations of the workpiece that is to be processed or machined and to be clamped tight, the cover member 32 can be brought into another starting position with respect to the housing 31, by raising and sliding. In this way, it is possible to accommodate the starting position of the housing and the cover member to the particular prevailing conditions, which demonstrates the great flexiblility and adaptability of such multiple thrust-producing units of the invention.

In FIG. 5, there is shown a bending or folding press 34 having an upper fixed jaw 36 and a lower, displaceable jaw 37 which is guided in a stationary member 39. The displaceable jaw 37 is furnished with a multiple thrust-producing member according to the invention. The housing of the invention is formed by the stationary member 39 with transverse walls 40 thereof, while the cover member of the invention is provided by the displaceable jaw 37 and the transverse walls 42 thereof. In the embodiment of FIG. 5, there is further provided a suitable sinuous hose in accordance with the invention, of which the operating bellows 44 are clearly shown. Actuation of the bending or folding press 34 and adjustment thereof to the thickness of the object that is to be bent or folded is effected in a manner analogous to that described hereinbefore with respect to FIGS. 1 to 4. In this way, as aforementioned, through addition of the individual forces, exceptionally high resultant or combined forces are capable of being produced with a minimum of construction space, the intensity of the resultant forces depending upon the number of operating bellows, the contact area thereof and the particular pressure of the working or pressure medium.

In FIG. 6a there is shown part of a hose 46 having arcuate portions 47 and 48 such as are provided in the sinuous hose 16 of FIG. 1. To prevent closure of the hose at the arcuate portions 47 and 48 thereof due to the occurrence of compressive and tensile stresses therein when the sinuous hose is supplied with pressure medium, so-called spacer inserts, constructed for example as elastic or resilient formed or profiled inserts 50 (FIG. 6b) are introduced into the hose. The inserts 50 prevent the hose from fully flapping together in bends and assure proper functioning of the operating and restoring bellows by the fact that they reliably afford passage for the pressure medium. With such pressure medium-actuated thrust producing members that are formed with the aid of hoses, and exceptionally vital and exacting sealing problem is produced when closing or tying off the ends of the hose. FIG. 7 shows in perspective view a flat hose closure device 53 that is made up of a cap 54 and a deformable filling body 56 which, if formed of elastic material, is provided with sealing lips 57.

FIG. 8 illustrates a hose end 59 which is tied or closed off by a flat hose closure member 53. For this purpose, a filling body 62 is slid into the interior of the hose end 59, and a corresponding cap 61 is slipped over the hose end 59 so that the filling body 62 is disposed between the walls of the hose end 59 and within the cap 61. Then the thus assembled members are compressed or pinched together as shown in FIG. 8. When the hose is then pressurized with working medium, it expands the filling body 62 and presses it against the thus held hose end 59 and the cap 61. The higher the working medium pressure, the stronger do the walls of the filling body 62 press against hose end 59 and the better the sealing.

Such a flat closure according to the invention affords the advantage over a round closure that when the hose as a thrust-producing member between two supporting walls 64 and 65 the entire length thereof is effective, whereas in the case of round closures, a considerable part of both ends cannot be effective and either requires the supporting walls 64 and 65 to be bent upwardly at the ends thereof or requires narrower supporting walls and accordingly smaller operating or working areas for the same length of the thrust member (FIG. 9).

In FIG. 10, there is shown a flat hose closure device analogous to that of FIG. 7 but however provided with an end closure having a supply inlet connector for working medium. The closure device of FIG 10 is made up of a cap 67 formed with an opening 68, and a tube insert 70 which carries a sealing collar 71, and also a filling body 73 formed with a suitable opening 74 to receive insert 70 therein.

FIG. 11 shows such a flat hose closure 76 with a supply inlet connector in the form of a supply nipple 77 which is analogous in construction to the tube insert 70.

Figure 13:
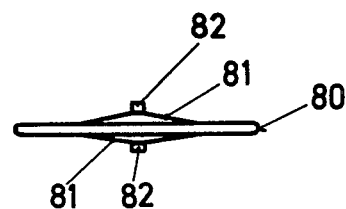
FIG. 13 is a side view of FIG. 12.

In order to prevent lateral shifting of such force or thrust producers that are in the form of hoses or hose closures between two flat or convex support surfaces or between one flat and one convex support surface, these members are provided with retaining or holding means. In FIGS. 12 and 13, part of hose 80 is shown that is provided along the length thereof with a path or track 81 and projections 82 that are secured by adhesive or by vulcanization thereto. The projections 82 are provided or engaging in corresponging openings formed in the supporting surfaces, and prevent lateral break-out of the hose especially in the operating phase thereof.

FIG. 14 is another embodiment of FIGS. 12 and 13 wherein projections 85 are disposed on attachment plates 84.

Figure 15:
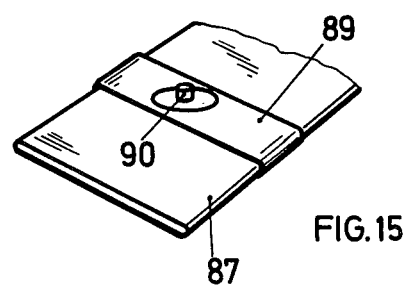
FIG 15 is a perspective view of yet another embodiment of FIG. 12.

In FIG. 15 there is shown a modified form of the embodiment of FIG. 14 wherein there are shown a hose section 87 and a band 89 with a projection 90, the band 89 being slid over the hose section 87.

Figure 16:
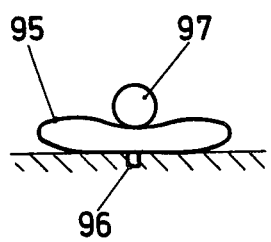
FIG. 16 is a diagrammatic side view of a hose according to the invention with an eye or lug and a projection for retaining the hose on flat and curved supporting surfaces.
Figure 17:
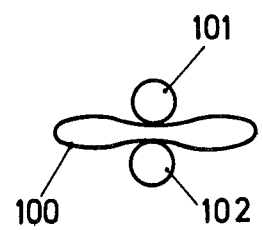
FIG. 17 is a view similar to that of FIG. 16 of a hose with eyes on both sides thereof for retaining the hose on two curved suporting surfaces.

In the same sense, a respective hose 95 with eyes or lugs 96 and projections 97, and a hose 100 with eyes 101 nd 102 are shown in FIGS. 16 and 17, respectively, the respective hose being firmly retained on the flat support surface with the aid of the projections 97, and on the round support surfaces with aid of either the eyes 96 or the eyes 101 and 102, as the case may be.

Figure 18:
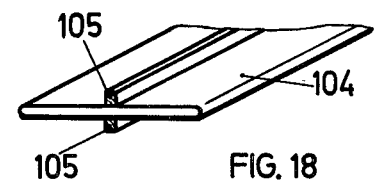
FIG. 18 is a perspective view of a hose end with guide rails or strips.

It is possible to produce hoses according to the inventionby extrusion (FIG. 18). A flat hose 104 is accordingly extruded directly with guide rails or strips 105 for retaining the hose.

Figure 19:
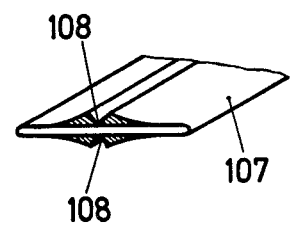
FIG. 19 is a view similar to that of FIG. 18 of a hose end with guide grooves.

In a similar sense, FIG. 19 shows an extruded profile in the form of a flat hose 107 with guiding grooves 108 which are provided to receive therein corresponding strips or rails formed on the support surfaces.

Figure 20:
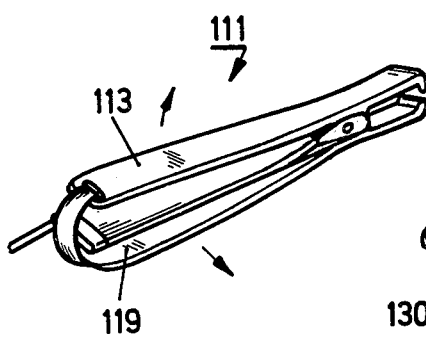
FIG. 20 is a perspective view of clippers or pliers which, according to the invention, have a hose-shaped thrust member subjectible to a pressure medium, and an elastic restoring clip.
Figure 21:
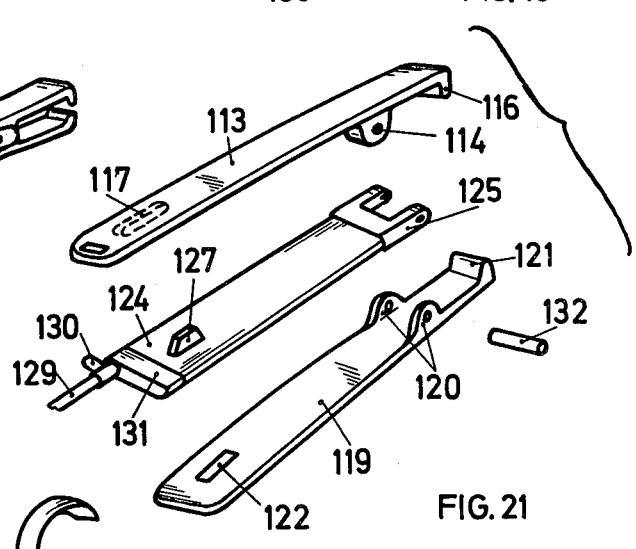
FIG. 21 is a perspective exploded view of the clippers or pliers of FIG. 20.

In FIGS. 20 and 21, there is shown a hand clipper or plier 111 with a grip or handle part 113 and provided with a bearing eye 114 as well as the with a connecting clamping jaw 116. The handle part 113 is formed with an opening 117 for a projection of a hose-shaped thrust-producing member according to the invention. A second handle part 119 is provided with corresponding bearing eyes 120 and also has a clamping jaw 121. In adition, an opening 122 formed in the second handle part 119 is kept free for engagement therein by a corresponding projection of the operating member. A thrust producing hose 124 is furnished with a bearing frame 125 for fixing it between both handle parts 113 and 119. The hose 124 carries a fixing projection 127, respectively, on both sides thereof that are accommodated in the openings 117 and 122 of the handle parts 113 and 119, in order to retain the hose 124. The hose 124 is moreover provided with a pressure medium connector 129 as well as with an actuating valve 130. The hose 124 is closed or tied off at both ends thereof by flat closure members 131, for example, in the same manner as in the embodiments of FIGS. 8 and 11. Bearing pins 132 serve for assembling the components shown in FIG. 21 by means of the various bearing eyes, into the clippers or pliers shown in FIG. 20. At the end of both handle parts 113 and 119 there is located a holder clip 134 which restores the clippers or pliers 111 or the handle parts 113 and 119, thereof, to the starting position thereof and thereby opens the clamping jaws 116 and 121.

Figure 22:
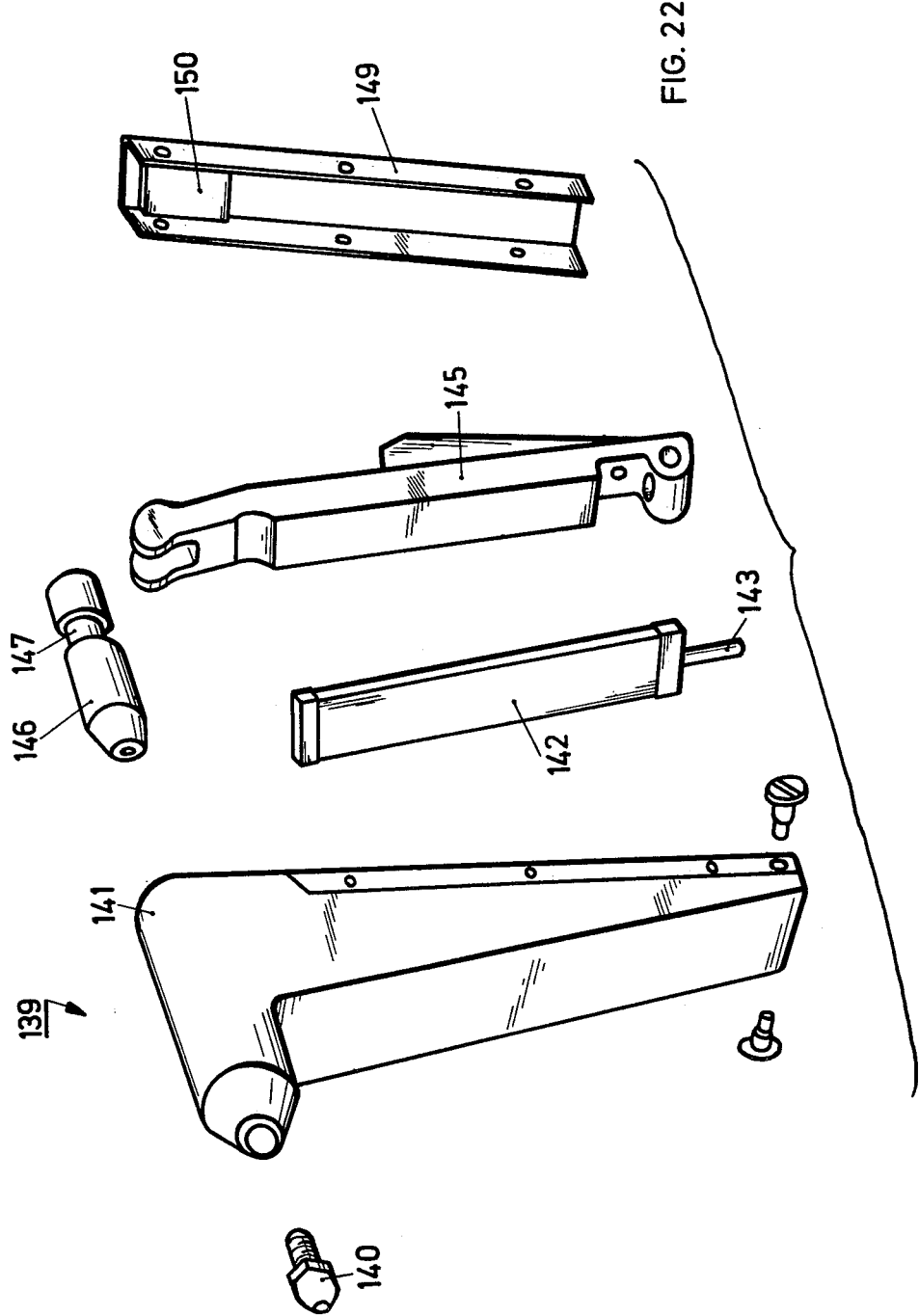
FIG. 22 is a perspective exploded view of blank riveting tongs constructed according to the invention.
Figure 23:
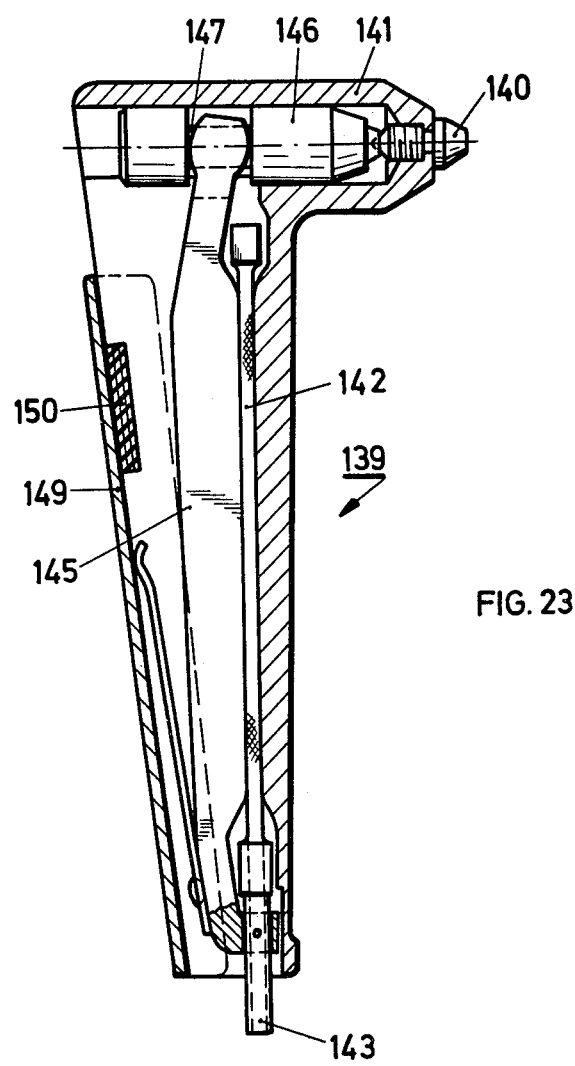
FIG. 23 is a longitudinal sectional view of an assembled embodiment of the blank riveting tongs of FIG. 22.

In FIGS. 22 and 23 there is illustrated blank riveting tongs 139 with a mouthpiece 140, a handle casing 141 and a force or thrust-producing member 142 with a connector nipple 143 as well as an additional lever 145 and a gripper 146 with a connecting link undercut or groove 147. A cover 149 with an interiorly disposed rubber stop 150 serves for covering the handle casing 141. The blank riveting tongs shown in FIGS. 22 and 23 afford the use of many-times greater forces than with hand tongs, which is why they are also suited for larger types of blank rivets than the heretofore known manually actuated tongs. The blank rivets can be formed significantly faster with one of the tongs of the invention which is even shorter than the heretofore known manual tools.

Figure 24:
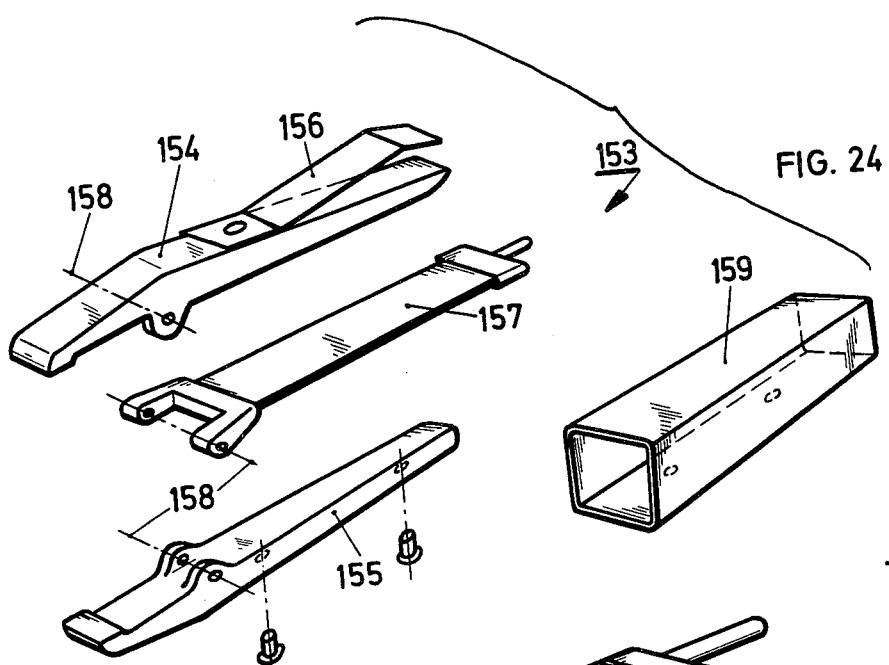
FIG. 24 is a perspective exploded view of a double lever clamping claw according to the invention.

FIG. 24 illustrates a double-arm clamping claw or pliers 153 with a shank 154 formed as a double arm lever, and a similar opposing shank 155. The shank 154 is provided with a spring 156. A force or thrust-producing member 157 is installed between both shanks 154 and 155 and, when actuated, both shanks 154 and 155 are provided about an axis 158, and the claw or clamp 153 clamps with a corresponding large force. These parts are stuck in a casing 159.

The double-arm clamping claw shown in FIG. 24 assures the use of large forces and large working angle or sweep in spite of small structural dimensions and low weight of the claw. This tool affords an undisturbed guidance as well as rapid actuation.

Figure 25:
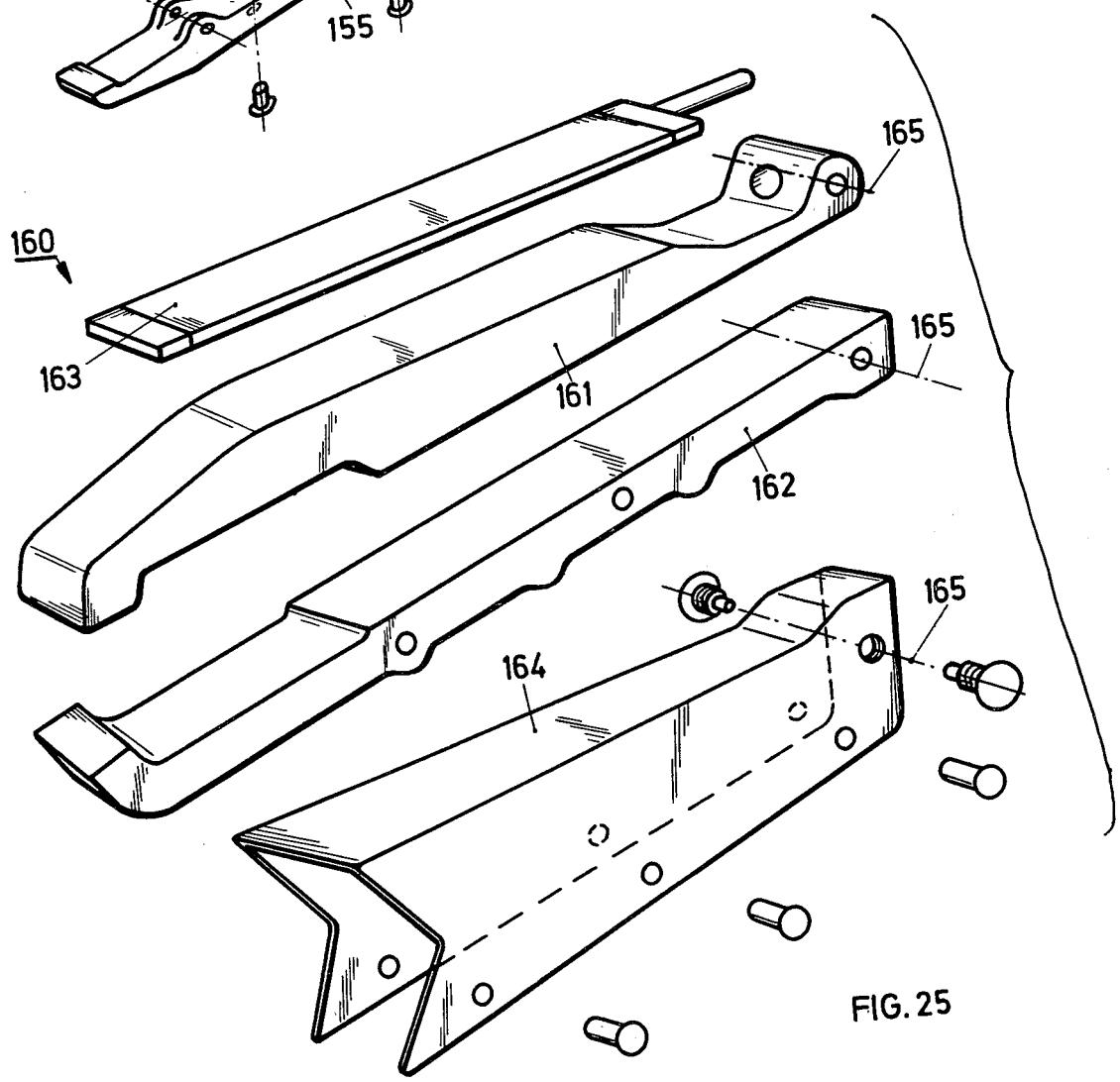
FIG. 25 is a perspective exploded view of a single lever clamping claw according to the invention.
Figure 26:
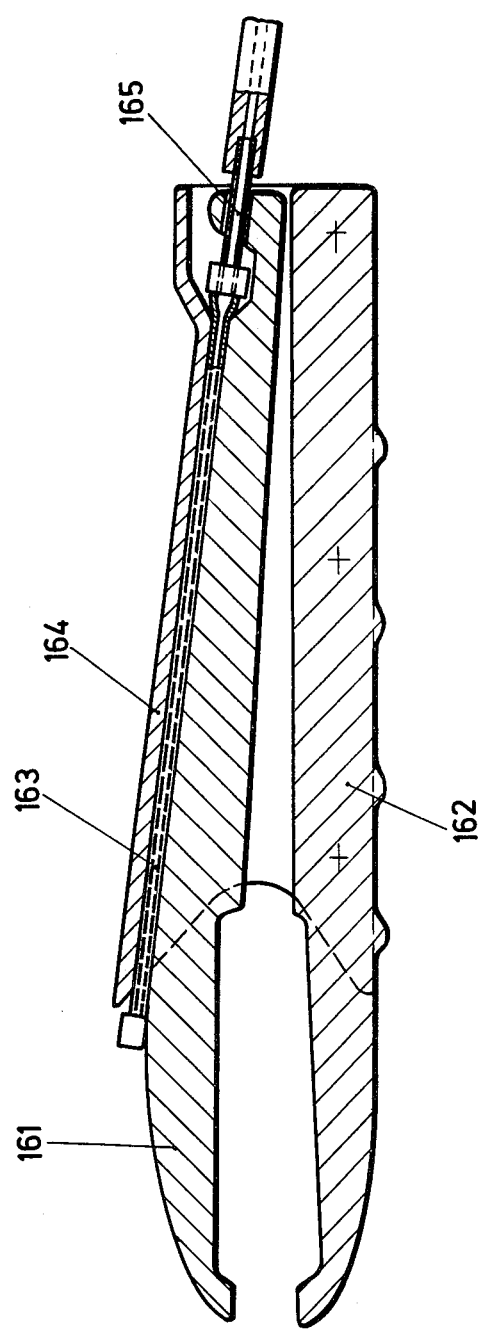
FIg. 26 is a longitudinal sectional view of an assembled embodiment of the single lever clamping claw of FIG. 25.

Another embodiment of a pincers-like clamping claw or pliers 160 is shown in FIG. 25. The claw 160 is made up of shank members 161 and 162, which are constructed, respectively as single-arm levers, as well as a force or thrust-producing member 163 constructed in accordance with the invention which, as shown in FIG. 26, is disposed on the one shank member 161 and, upon actuation of the latter, is pressed against the other shank member 162. The members 161 to 163 are mounted in a casing 164. At the actuation of the force-producing member 163, the shank arm 161 pivots about the axis 165, and the clamping claw or pliers 160 reaches the clamping position thereof.

The advantages of the claw or pliers embodiment shown in FIG. 24 are also provided by that of FIGS. 25 and 26. However, especially large sweeps or working angles are possible with the embodiment of the latter figures. The claw or pliers 160 has jaws which are displaced substantially parallel to one another, a feature that is of particular advantage for performing a stamping or perforating operation.

In a similar manner clippers, pincers, pliers, tongs, claws, grippers, disconnectors, strippers, spreaders or spacers, stamping or embossing pliers, bending or folding pliers, plumbing or sealing pliers, cutting pliers, flanging pliers as well as punching or compression pliers and the like can be produced with the aid of force or thrust-producing hose members according to the invention, that are actuated by a pneumatic or hydraulic or other fluid or fluidized pressure medium. Besides blank riveting tongs, blank nut wrenches or pliers and plug or stopper wrenches as well as fastening or stapling pliers or tongs can be produced. All of the foregoing are thereby believed to be well within the scope of the invention of this application.

A further range of utility of the invention of this application is in stationary assemblable, tong-like presses, shears, pulse welding pliers or tongs, pliers-like sheet metal or wire feeding devices and the like. The control of such tongs or pliers may be effected by means of built-in three-way valves, and mechanically actuable, by foot actuation or by control switches constructed at the handle and that are for example, magnetically actuable.

I claim:

1. Tool comprising a force-producing device having at least one inflatable thrust producing member displaceable so as to apply a given force, a pivotally displaceable member engageable by said inflatable thrust producing member and pivotally displaceable thereby and a member on which said pivotally displaceable member is pivotally mounted on an axis about which the displaceable member pivots, and wherein said pivotally displaceable member is a lever handle movable relative to another member and forming tongs, and wherein said other member is another lever handle, with said inflatable thrust producing member being disposed between both said lever handles, and including resilient means connected to said lever handles for restoring the tongs to their initial open position.

2. Tool according to claim 1 wherein said tongs are pincer-formed.

3. Tool according to claim 1 wherein said inflatable member comprises a hose having pressure-tightly closed ends.

4. Tool according to claim 3 wherein said hose ends are closed by a cap respectively extending over said hose ends and by a respective corresponding elastic body received in the interior of said hose, said cap having a crimp therein form-locking both said cap and said elestic body with said hose.

5. Tool according to claim 1 wherein said inflatable member is formed of elastic profile material.

6. Tool comprising a force-producing device having at least one inflatable thrust producing member displaceable so as to apply a given force, a pivotally displaceable member engageable by said inflatable thrust producing member and pivotally displaceable thereby and a member on which said pivotally displaceable member is pivotally mounted on an axis about which the displaceable member pivots, said inflatable thrust producing member being disposed between said pivotally displaceable member and said mounted member, means for securely retaining said inflatable member in the tool and wherein said retaining means is a holder member, and including another member cooperating with said holder member for securing said inflatable member in the tool, one of said members comprising a pin and the other formed with an eye wherein said pin is receivable.

7. Tool comprising a force-producing device having at least one inflatable thrust producing member displaceable so as to apply a given force, a pivotally displaceable member engageable by said inflatable thrust producing member and pivotally displaceable thereby and a member on which said pivotally displaceable member is pivotally mounted on an axis about which the displaceable member pivots, said inflatable thrust producing member being disposed between said pivotally displaceable member and said mounted member, means for securely retaining said inflatable member in the tool, and wherein said retaining means is a holder member, and including another member cooperating with said holder member for securing said inflatable member in the tool, one of said members comprising a ledge and the other formed with a groove wherein said ledge is receivable.

* * * * *